US006690458B2

(12) United States Patent
Schorr

(10) Patent No.: US 6,690,458 B2
(45) Date of Patent: Feb. 10, 2004

(54) METHODS AND APPARATUSES FOR RECONSTRUCTING ANGLE INFORMATION

(75) Inventor: David Schorr, Austin, TX (US)

(73) Assignee: BAE Systems Information and Electronics Systems Integration Inc., Nashua, NH (US)

(*) Notice: Subject to any disclaimer, the term of this patent is extended or adjusted under 35 U.S.C. 154(b) by 0 days.

(21) Appl. No.: 10/301,485

(22) Filed: Nov. 21, 2002

(65) Prior Publication Data

US 2003/0142295 A1 Jul. 31, 2003

Related U.S. Application Data

(60) Provisional application No. 60/334,386, filed on Nov. 30, 2001.

(51) Int. Cl.[7] .................. G01B 11/26; G01C 21/02; G01C 17/00; G01S 5/02; G06K 9/00
(52) U.S. Cl. .................. 356/141.5; 250/206.2; 342/420; 382/103; 702/151
(58) Field of Search .................. 356/139.01–141.5; 244/3.13, 3.16; 348/169–172; 250/203.1–203.3, 206.1–206.3, 208.1–208.3; 382/103; 342/420; 702/151

(56) References Cited

U.S. PATENT DOCUMENTS

| 4,383,663 A | 5/1983 | Nichols .................. 244/3.16 |
| 4,562,439 A | 12/1985 | Peralta et al. .................. 343/17.1 |
| 5,273,236 A | 12/1993 | Wootton et al. .................. 244/3.11 |
| 5,657,251 A | 8/1997 | Fiala .................. 342/162 |
| 5,724,047 A | 3/1998 | Lioio .................. 342/442 |
| 5,764,192 A | 6/1998 | Fowler et al. .................. 343/705 |
| 5,818,393 A | 10/1998 | Fowler et al. .................. 343/705 |
| 6,014,473 A | * 1/2000 | Hossack et al. .................. 382/294 |
| 6,104,345 A | 8/2000 | Tweg et al. .................. 342/417 |
| 6,125,308 A | * 9/2000 | Hills et al. .................. 701/1 |
| 6,313,794 B1 | 11/2001 | Rose .................. 342/342 |

FOREIGN PATENT DOCUMENTS

| EP | 0 247 014 | 11/1987 |
| FR | 2 625 396 | 6/1989 |

* cited by examiner

*Primary Examiner*—Stephen C. Buczinski
(74) *Attorney, Agent, or Firm*—Fulbright & Jaworski, LLP

(57) ABSTRACT

Methods and apparatuses for determining angular information from a target. A plurality of sensors on an image plane are used to obtain measured amplitude data. An azimuth and elevation may be estimated using this measured amplitude data. A residual error between the measured amplitude data and calibrated amplitude data may then be determined. The angular information corresponding to the azimuth and elevation at which the residual error is minimized may then be outputted as representing or corresponding to the angular information of the target.

16 Claims, 3 Drawing Sheets

METHODS AND APPARATUSES FOR RECONSTRUCTING ANGLE INFORMATION

This application claims priority to U.S. Provisional Patent Application Serial No. 60/334,386 filed Nov. 30, 2001. That application is incorporated herein by reference in its entirety.

BACKGROUND OF THE INVENTION

Reference to Appendix

This application includes a computer program listing appendix, submitted on compact disc (CD). The content of the CD is hereby incorporated by reference in its entirety and accordingly forms a part of this specification. The CD contains the following file:

File name: Angle.txt

File size: 38.1 kb

Creation date for CD: Nov. 21, 2002

1. Field of the Invention

The present invention relates generally to the fields of position sensors and the analysis of positional data. More particularly, it concerns methods and apparatuses for efficiently reconstructing angle information by analyzing data from a set of independent sensors. Even more particularly, it concerns the reconstruction of angle information by comparing a data set from independent sensors with a calibration data set and minimizing an error function between those sets of data to reconstruct angle information.

2. Description of Related Art

The ability to gather data from one or more sensors and translate that data into meaningful positional information is important in a wide variety of disciplines. For instance, tracking objects is essential for commercial aircraft controllers and an assortment of military applications.

Over the years, sundry techniques aimed at determining positional information, such as angular information, from sensor readings have been developed. Although each has shown at least a degree of success in its respective application, room for significant improvement remains.

U.S. Pat. No. 5,724,047, which is hereby incorporated by reference, involves a precision direction finding system for making precision angle of arrival estimates for a signal received through two antenna elements separated in space. Phase interferometry is used to determine a precise angle of arrival, with multiple ambiguities due to the periodic nature of the phase difference related to geometric angle. The interferometric ambiguities are resolved using the time difference of arrival (TDOA) of the signal at the two antenna elements. TDOA is measured using leading edge envelope detection for simple pulsed signals, and predetection correlation for phase and frequency modulated signals. Although such phase interferometry determinations may exhibit certain advantages over other conventional methods, shortcomings remain due to, at least in part, the relatively complex nature of the computations required to implement the methodology. Further, reliance upon two antenna elements, rather than a plurality of independent sensors, may inhibit at least some flexibility of such a system.

U.S. Pat. No. 6,104,345, which is hereby incorporated by reference, involves a method for the direction of arrival (DOA) tracking of at least one source, along a single azimuth axis or along both azimuth and elevation axes. The method includes the steps of selecting all the high peaks from a DOA function as potential track points, converting the potential track points into a plurality of tracks and selecting a true track from the plurality of tracks. This methodology also suffers from some shortcomings; for example, it may be desirable to avoid the particular computational complexity involved with selecting a true track from the plurality of potential track points.

U.S. Pat. No. 4,562,439, which is hereby incorporated by reference, involves an imaging radar seeker for producing two-dimensional images of a target, which can be mounted on a missile or other moving body, such as an automobile. A computer directs the seeker to operate sequentially in searching, tracking, and imaging modes. In the searching mode, a combination of circumferential rotation of an antenna of the seeker and frequency scanning of electromagnetic energy fed to the antenna enables the seeker to search for its target over a conical field-of-view or a wider, peripheral belt field-of-view. In the imaging mode, circumferential rotation of an antenna is stopped, and the tilt angle of a linear array of the antenna is stepped or continuously moved to compensate for radial movement of a radiated beam caused by frequency stepping imparted by a frequency synthesizer. This keeps the beam fixed in space and centered on the target. Inverse synthetic aperture imaging is used to create a two-dimensional image of the target wherein the first dimension (range) is obtained by performing inverse Fourier transforms on the echo signals, and the second orthogonal dimension (cross-range or doppler frequency) is obtained by performing Fourier transforms. The array can be a linear array of E-plane stacked linear waveguide antenna elements operating in either the traveling wave mode or the standing wave mode. Such methodology too exhibits shortcomings at least due to its complexity, lack of flexibility, and its inability to more efficiently perform angle reconstruction determinations.

U.S. Pat. No. 5,818,393, which is hereby incorporated by reference, involves a fixed body wide field-of-view conformal antenna array suitable for broadband precision direction finding on missile platforms. The array is configured as multiple sub-arrays of spiral antennas that cover particular regions within the desired field-of-view of the entire array. A lower cost, more reliable and more accurate direction finding solution for missile needs is provided, primarily by the elimination of conventional radomes and antenna gimbal structures. The array can be configured to include multimode sensors. Although useful in this elimination of structures, this methodology exhibits room for significant improvement given its inability to more efficiently reconstruct angular information.

U.S. Pat. No. 6,313,794, which is hereby incorporated by reference, uses feedback from RF carrier frequency measurements to disassociate the emitter angle-of-arrival component in the ambiguous phase measurement from the initially unknown phase measurement integer ambiguities. It then resolves the ambiguities and obtains the correct emitter angle-of-arrival (AOA). This is accomplished by converting the actual interferometer baselines on which the unassociated pulse phase measurements were made at different emitter frequencies to a baseline set for a single-frequency equivalent interferometer array. This methodology, as with the methodologies described above, suffers from issues relating to complexity, flexibility, and the inability to more quickly and efficiently reconstruct high-resolution angular information.

U.S. Pat. No. 5,657,251, which is hereby incorporated by reference, involves a computer-implemented process for processing incoming target data from a focal plane or scanning radar to accomplish multiple Target Tracking. Inputs are pixel plane coordinates and intensity of target blips. The Intelligent Target Tracking Processor (ITTP) employs an optimal target tracking algorithm. An optimal observation-to-track assignment exists when all target blips in a new frame of target data are matched up with nearby tracks, such that the sum of all the distances from each target blip to its assigned track is minimized. An expert system is used to control overall processing flow and provide efficient allocation of computing resources. Target blips without near neighbors are allowed to go directly to a real track table of established tracks, if their coordinates match-up with projected tracking gates. Otherwise, target blips are tested sequentially against two-frame, three-frame, and four- or higher-frame discriminants, to reject blips not belonging to established tracks. The ITTP can partition the pixel plane into "bite size partitions", each with a manageable number of target blips, which it handles sequentially. The ITTP is designed to handle hundreds or thousands of targets as a stand-alone processor as is required in space object tracking or military scenarios. The expert system maintains an optimum balance between correlating on existing tracks and discriminating against impossible tracks. A total of 26 different metric and radiometric target tracking discriminants are employed. The ITTP is a dynamically and optimally configured set of general purpose parallel processors. Although useful for trajectory tracking for applications such as air-traffic controlling, this methodology nevertheless includes shortcomings; for instance, it does not allow for the reconstruction of high quality, high resolution angle information using a plurality of independent sensors or detectors on an image plane.

Problems enumerated above are not intended to be exhaustive, but rather are among many that tend to impair the effectiveness of previously known techniques concerning positional tracking and the determination of angle information. Other noteworthy problems may also exist; however, those presented above should be sufficient to demonstrate that methodology appearing in the art have not been altogether satisfactory. In particular, existing techniques do not adequately allow for the determination of angle information with improved resolution from independent sensors or detectors on an image plane.

SUMMARY OF THE INVENTION

Shortcomings listed above are reduced or eliminated by the techniques disclosed herein. These techniques are applicable to a vast number of applications, including general targeting and tracking applications.

In one respect, the invention is a method for determining angular information from a target. Measured amplitude data is obtained from a plurality of sensors. An azimuth and elevation are estimated using the measured amplitude data. Calibrated amplitude data corresponding to the azimuth and elevation is obtained. A residual error between the measured amplitude data and the calibrated amplitude data is determined. Aspects of this process are performed iteratively until the residual error is minimized. The angular information, which corresponds to the azimuth and elevation at which the residual error was minimized, is then output.

In other respects, the invention is a computer program, comprising computer or machine readable program elements translatable for implementing the method described above. Further the invention is an apparatus for performing such a method.

In another respect, the invention is a method for determining angular information from a target. A plurality of sensors on an image plane are obtained. The target or a point target is defocused on the image plane such that one or more of the sensors respond to a target pulse. Measured amplitude data from the plurality of sensors is obtained. An azimuth and elevation are estimated using the measured amplitude data. Calibrated amplitude data corresponding to the azimuth and elevation is obtained. A residual error between the measured amplitude data and the calibrated amplitude data is determined. Aspects of this process are performed iteratively until the residual error is minimized. The angular information, which corresponds to the azimuth and elevation at which the residual error was minimized, is then output.

In other respects, the invention is a computer program, comprising computer or machine readable program elements translatable for implementing the method described above. Further the invention is an apparatus for performing such a method.

In another respect, the invention is a system for determining angular information from a target. The system includes a plurality of sensors and a computer. The computer is configured to: (a) acquire measured amplitude data from the plurality of sensors; (b) estimate an azimuth and elevation using the measured amplitude data; (c) access calibrated amplitude data corresponding to the azimuth and elevation; (d) determine a residual error between the measured amplitude data and the calibrated amplitude data; and (e) output the angular information as corresponding to the azimuth and elevation at which the residual error is minimized.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
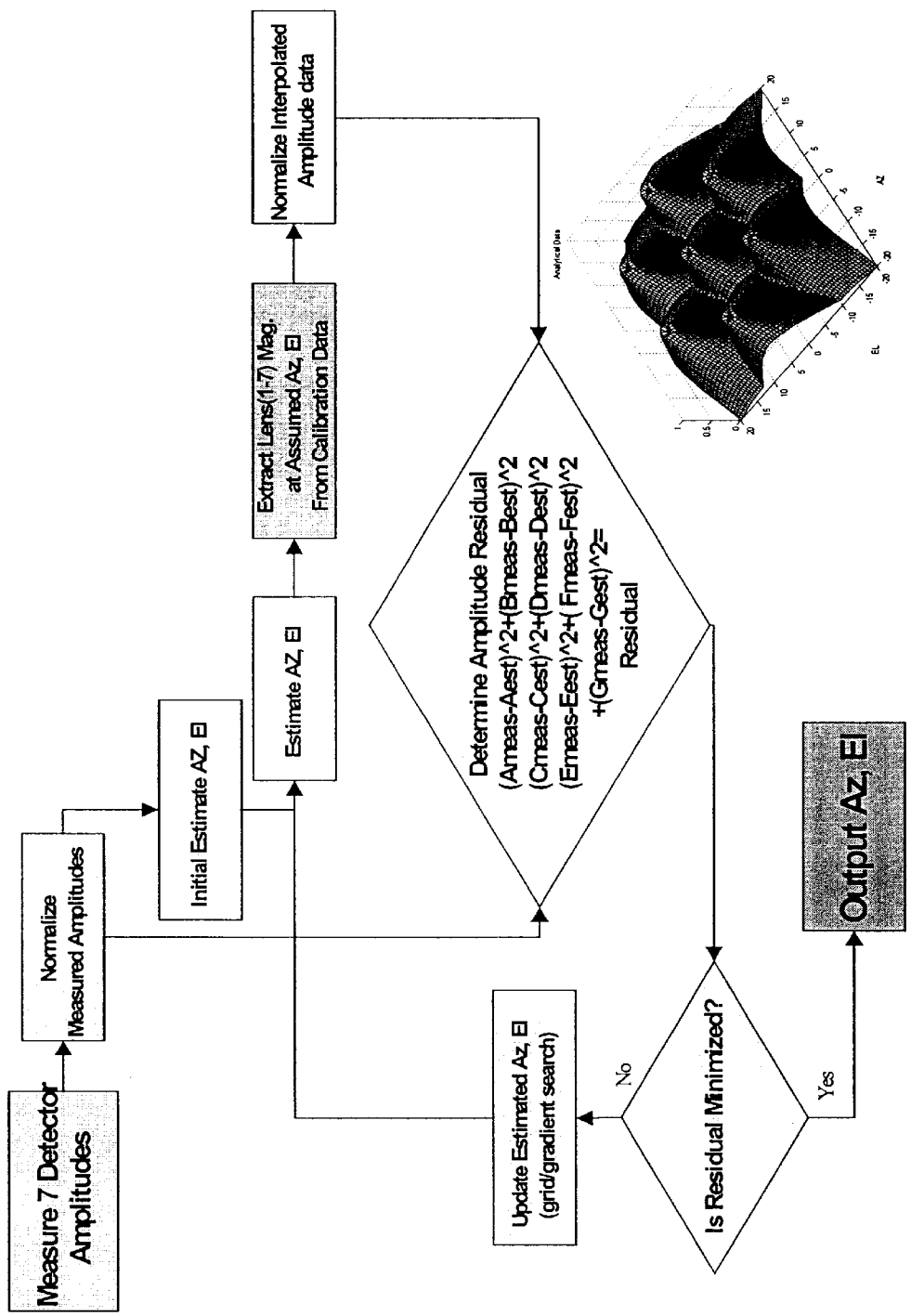
FIG. 1 is a flowchart showing techniques for reconstructing angle information in accordance with embodiments of the present disclosure.

The present disclosure describes apparatuses and methods for efficiently determining high-quality, high-resolution angle information from several independent sensors on an image plane. Applications for this technology are vast. For instance, one may use the techniques disclosed herein in a variety of military applications. Similarly, one may find applications in aircraft traffic controlling, general target seeking and/or tracking, and any other application where angular information is required. With the benefit of the present disclosure, those having skill in the art will comprehend that the techniques disclosed herein may be modified and applied to a number of additional, different applications. The present disclosure and claims attached hereto cover all such modifications that fall within the scope and spirit of this disclosure.

In one embodiment, the techniques for determining angle information may take the form of what the inventor has coined an "angle reconstruction algorithm." The angle reconstruction algorithm is one method for improving the resolution and quality of angle information from relative amplitude measurement information given a set of independent sensors or detectors on an image plane. These sensors may be part of a CCD, thermal imaging array, a quadrant detector, or any other device suitable for gathering data relevant to angular information. The angle reconstruction process may involve producing a "match" between predicted or calibrated relative amplitude responses and measured relative amplitude responses. In one embodiment, this match may involve minimizing a residual error function, although those having skill in the art will understand that other mathematical techniques may be employed to determine a correspondence between the predicted or calibrated amplitudes and the measured responses.

In one embodiment, a LASER seeker field-of-view (FOV) may be broken up into a plurality of distinct pixels. In one embodiment, seven pixels may be used, although more or fewer pixels may be utilized depending upon preference and/or the specific application in question. A point source may be defocused on the image plane such that a plurality of sensors respond to a given target pulse. In the embodiment using seven pixels, for instance, a point source may be defocused such that at least 3 of 7 independent detectors respond to a target pulse.

The resulting amplitudes from each of the detectors (7 in the embodiment discussed above) for a given received pulse may then be compared with expected amplitudes from either predictions or calibration data for each location in the FOV. The location in the FOV that produces a match or correspondence, which may take the form of exhibiting the least residual error between the predicted response magnitudes and the actual response amplitude measurements, is then determined to be the target's location in the field of view. Hence, angle (and position) information may be efficiently obtained.

As will be understood by those having skill in the art, one may determine an appropriate correspondence between measured amplitudes and prediction or calibration sets of data in many ways, including the determination of a minimum residual error. In one embodiment, a rather robust and computationally-intensive approach is to accomplish a grid search of a region of interest. The residual between the amplitude response prediction and the actual measured amplitude response may be compared for all grid points. The grid point resulting in the lowest residual is assumed to be the best estimate of the targets location in the FOV. Refinement of the grid search interval may be accomplished until a particular desired level of accuracy is achieved.

Other computationally-efficient methods of finding the location in the FOV with the lowest residual may be readily implemented according to programming and mathematical methods known in the art. Different methods may, of course, amount to a significant reduction in the computational effort required to find a target location in the field of view.

Angle reconstruction techniques of this disclosure applied to an imaging array or other sensors provide for angle resolution much greater than would be derived based on the estimated angular extent of a pixel on the image plane. Intentional defocusing of the target (when angular extent is less than 1 pixel) or point target allows for relative amplitude data to be collected on multiple adjacent pixels. The relative amplitude data from each pixel can then be utilized to determine the power centroid of an extended target or a point source in the FOV.

These techniques allow very noisy non-linear raw sensor data to be interpreted into angle of arrival (AOA) with the aid of a database and an appropriate calibration set of data or data forming the basis of a prediction set of data. Noise corruption of the measured signal levels often prevents a perfect match to angle of arrival to be made; however, extremely good estimates of angle of arrival may be readily made with an angle reconstruction algorithm as described herein. No loss of bandwidth need be realized since previous data does not have to be utilized in determining the angle of arrival output.

Apparatuses suitable for implementing aspects of the methods described herein may include equipment known in the art such as sensors, detectors, seekers, etc. Additionally, the apparatuses may include one or more computers to analyze the sensor data, in accordance with the techniques described herein via corresponding software. The one or more computers may be networked and may be in contact with one or more local or remote databases or storage networks that store calibration or prediction data sets relating to the sensors or arrays.

The following examples are included to demonstrate specific embodiments of this disclosure. It should be appreciated by those of skill in the art that the techniques disclosed in the example which follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Turning to FIG. 1, there is shown a flowchart illustrating one embodiment of a suitable angle reconstruction algorithm in which 7 detectors are used. As the flowchart shows, amplitudes from the seven detectors are first measured and then normalized, if necessary. This information is used to form an initial estimate of both azimuth (AZ) and elevation (El) information. Using a database or another appropriate storage device or network, one may then extract amplitude information corresponding to the initiallyestimated AZ and El from calibration or prediction data. This amplitude information may be normalized, if necessary. With the measured and calibration amplitude information, both corresponding to the initially-estimated AZ and El, one may then determine a residual error function (or determine a correspondence between the data sets using an alternative method).

In FIG. 1, the amplitude residual is determined by considering the difference between the measured amplitude and the amplitude from the calibration set, for each and every detector (detectors A through G). Specifically, one may sum the squares of the differences of those amplitudes, as shown, to arrive at the residual value. In FIG. 1, $A_{meas}$ means the measured amplitude from detector A, while $A_{est}$ means the amplitude at the estimated AZ and El from the calibration set.

If this residual value is not the minimum value, the initial estimate of AZ and El is updated, as shown. With this new AZ and El estimate, amplitude information may again be extracted from the calibration data set—this time, the calibration information will correspond to newly-estimated AZ and El. Again, normalization of the calibration amplitude information may be required. Once again, a residual error function may be obtained by considering the differences between the measured and calibration amplitudes. And, once again, if the residual is not minimized, the estimate of AZ and El may be updated, thereby repeating the process.

However, if the residual is minimized, one may output the AZ and El that accountable for the minimization. It is this AZ and El that represents the angle information of the target or object being studied.

Figure 2A:
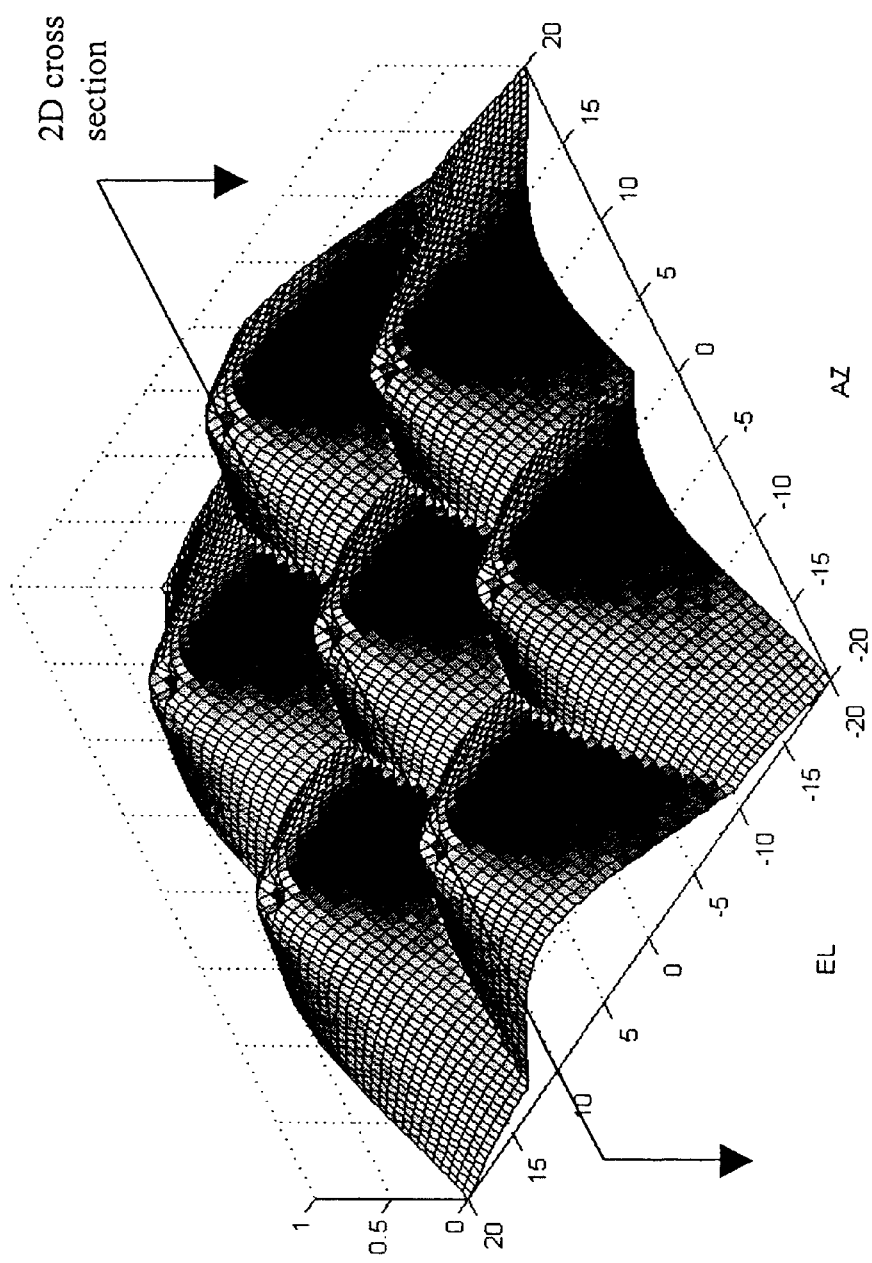
FIGS. 2A and 2B show exemplary data involving angle information in accordance with embodiments of the present disclosure.
Figure 2B:
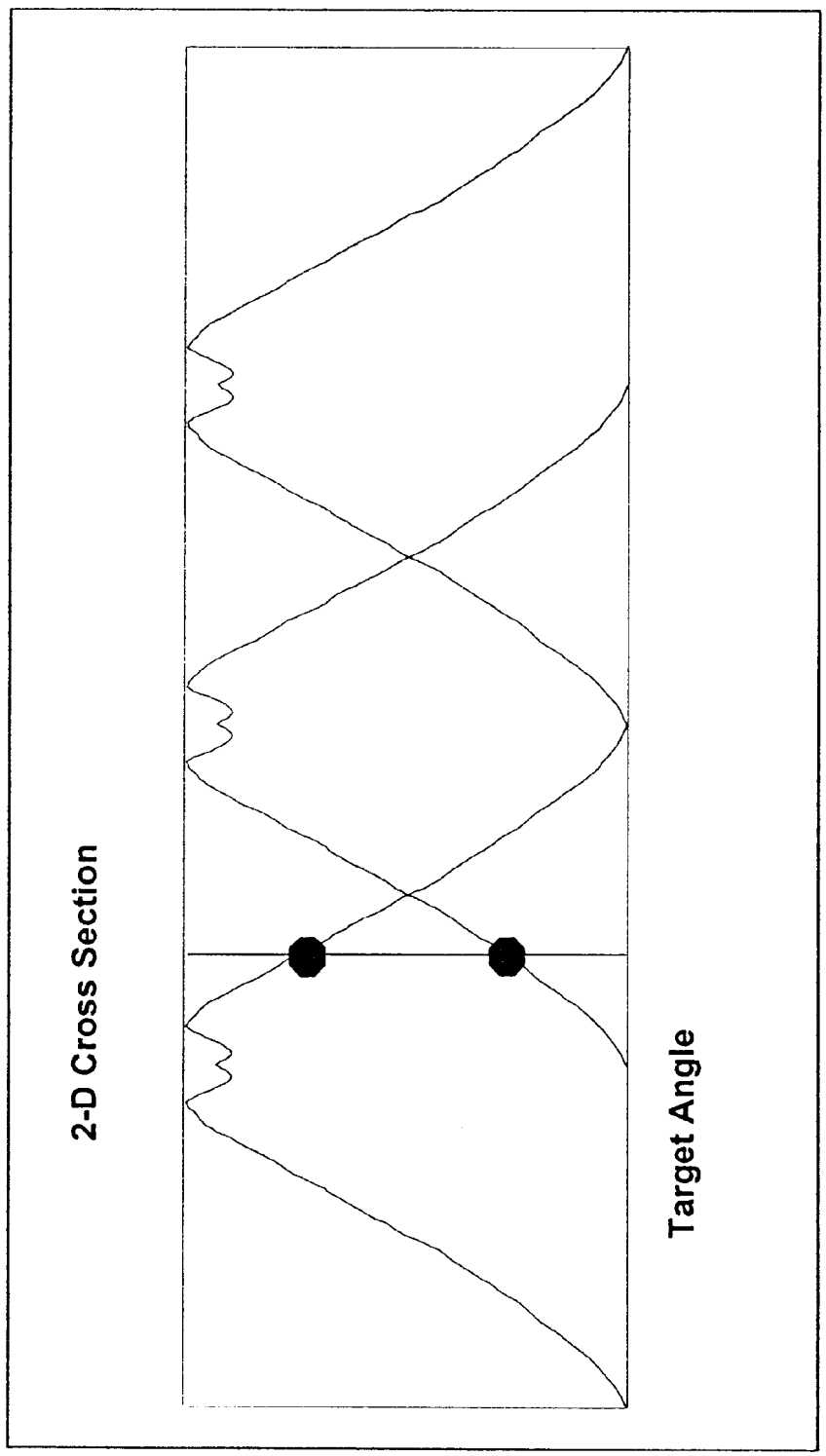

FIGS. 2A and 2B show exemplary amplitude data from seven detectors.

This example and the disclosure herein shows that, in general, target location and angular information may be triangulated by comparison to a look up table (which may take the form of the calibration data set or prediction data discussed above). The look up table may be several dimensions, including 3. The look up table may be built-up via calibration steps. Specifically, one may position a target sequentially at various, known locations throughout a grid. At each location, one may take sensor readings from a plurality of sensors to obtain relative light amplitudes. Taking multiple readings of this sort builds up a library of amplitudes as a function of target locations. This library may then be used to compare with measured amplitudes in the fashion described herein (for example, by determining a residual error function) to quickly determine the angular and positional information of a target based on measured amplitude data from those same sensors.

EXAMPLE 2

A computer program listing appendix has been submitted. (which has been incorporated by reference) containing source code, written in FORTRAN, that is suitable for carrying out techniques described herein. This source code is exemplary only and does not limit the scope of the claims appended hereto. It simply represents one specific embodiment for carrying out aspects of this disclosure and is included for the convenience of the reader in this regard. Those having skill in the art, with the benefit of this disclosure, will recognize that a wide variety of computational techniques and different types of corresponding source code and software (and/or corresponding hardware) may be used in implementing the concepts described herein.

What is claimed is:

1. A method for determining angular information from a target, comprising:
   (a) obtaining measured amplitude data from a plurality of sensors;
   (b) estimating an azimuth and elevation using the measured amplitude data;
   (c) obtaining calibrated amplitude data corresponding to the azimuth and elevation;
   (d) determining a residual error between the measured amplitude data and the calibrated amplitude data;
   (e) repeating steps (b) through (d) until the residual error is minimized; and
   (f) outputting the angular information as corresponding to the azimuth and elevation at which the residual error was minimized.

2. The method of claim 1, wherein obtaining measured amplitude data comprises obtaining measured amplitude data from seven sensors.

3. The method of claim 1, wherein one or more of the sensors comprise a CCD, thermal imaging array, or a quadrant detector.

4. The method of claim 1, wherein obtaining measured amplitude data comprises defocusing of the target.

5. The method of claim 1, further comprising determining a power centroid of the target using the measured amplitude data.

6. The method of claim 1, wherein determining the residual error comprises summing differences between the measured amplitude data and the calibrated amplitude data.

7. A computer program, comprising computer or machine readable program elements translatable for implementing the method of claim 1.

8. An apparatus for performing the method of claim 1.

9. A method for determining angular information from a target, comprising:
   (a) obtaining a plurality of sensors on an image plane;
   (b) defocusing the target or a point target on the image plane such that one or more of the sensors respond to a target pulse;
   (c) obtaining measured amplitude data from the plurality of sensors;
   (d) estimating an azimuth and elevation using the measured amplitude data;
   (e) obtaining calibrated amplitude data corresponding to the azimuth and elevation;
   (f) determining a residual error between the measured amplitude data and the calibrated amplitude data;
   (g) repeating steps (d) through (f) until the residual error is minimized; and
   (h) outputting the angular information as corresponding to the azimuth and elevation at which the residual error was minimized.

10. The method of claim 9, wherein obtaining measured amplitude data comprises obtaining measured amplitude data from seven sensors.

11. The method of claim 9, wherein one or more of the sensors comprise a CCD, thermal imaging array, or a quadrant detector.

12. The method of claim 9, further comprising determining a power centroid of the target using the measured amplitude data.

13. The method of claim 9, wherein determining the residual error comprises summing differences between the measured amplitude data and the calibrated amplitude data.

14. A computer program, comprising computer or machine readable program elements translatable for implementing the method of claim 9.

15. An apparatus for performing the method of claim 9.

16. A system for determining angular information from a target, comprising:
   a plurality of sensors on an image plane; and
   a computer configured to:
      acquire measured amplitude data from the plurality of sensors;
      estimate an azimuth and elevation using the measured amplitude data;
      access calibrated amplitude data corresponding to the azimuth and elevation;
      determine a residual error between the measured amplitude data and the calibrated amplitude data; and
      output the angular information as corresponding to the azimuth and elevation at which the residual error is minimized.

* * * * *